United States Patent [19]
Geary

[11] 3,908,601
[45] Sept. 30, 1975

[54] CONTROL SYSTEM FOR ANIMAL FEEDER

[75] Inventor: Frederick J. Geary, Holland, Mich.

[73] Assignee: U.S. Industries, Inc., New York, N.Y.

[22] Filed: Aug. 23, 1974

[21] Appl. No.: 500,022

[52] U.S. Cl. .......................................... 119/52 AF
[51] Int. Cl.² .......................................... A01K 5/02
[58] Field of Search ..................... 119/52 AF, 53, 51

[56] References Cited
UNITED STATES PATENTS

| | | | |
|---|---|---|---|
| 3,033,163 | 5/1962 | Hostetler et al. | 119/52 AF |
| 3,476,087 | 11/1969 | Scott et al. | 119/52 AF |
| 3,566,843 | 3/1971 | Van Huis | 119/53 |

*Primary Examiner*—Hugh R. Chamblee
*Attorney, Agent, or Firm*—Price, Heneveld, Huizenga & Cooper

[57] ABSTRACT

A feeder of the type having a supply hopper and an elongated trough communicating with a plurality of spaced feeding pans includes a drive motor for an auger transferring feed from the hopper to the individual pans. An end pan includes a level control switch actuated when the feed reaches a predetermined level. The feeder trough includes a shock wire activated by a high voltage supplied by a control circuit for supplying both feed control signals to the motorized auger and a shock voltage for the shock wire. The level switch is coupled to the shock wire and the control circuit is current sensitive to distinguish between current corresponding to a feed command signal and shocking current to actuate the auger motor only upon detection of a feed demand signal.

11 Claims, 2 Drawing Figures

CONTROL SYSTEM FOR ANIMAL FEEDER

BACKGROUND OF THE INVENTION

The present invention relates to animal feeders of the type including a shock wire and a motorized feed supply system and specifically to an improved control circuit therefor.

In animal feeders and particularly poultry feeders, a hopper supplies food to a plurality of spaced pans by an elongated auger interconnecting the spaced pans and the hopper. The pan at the remote end of the auger from the hopper includes a level switch for actuating an auger drive motor such that when the end pan has been filled to a predetermined level and thus the intermediate pans are likewise filled, the motor will automatically shut off.

This type of feeder is typically suspended from the roof of an installation and includes a wire extending along the auger tube and activated at a relatively high voltage to prevent chickens or other poultry from roosting on the auger tube. Such an arrangement is disclosed in U.S. Pat. Nos. 3,530,833 issued to D. D. Allen on Sept. 29, 1970 and 3,566,843 issued to R. L. Van Huis et al. on Mar. 2, 1971. In such systems, the shock wire is supplied by an independent high voltage supply while the motor control circuit is separate and distinct. With such systems where the auger motor is mounted to the hopper and the feed control switch is on the feed pan at the opposite end of the feeder, additional wiring is required between the opposite ends of the auger tube for coupling the switch to the motor control circuit.

SUMMARY OF THE INVENTION

The system of the present invention, however, employs an improved control circuit coupled to the shock wire and to the feed level switch at the last pan and utilizes the shock wire as the transmission line for both supplying a relatively high voltage to the shock wire and for transmitting feed command signals. The circuit is current responsive to discriminate between feed demand current and current passing through a chicken under shock such that the auger motor is actuated only upon receipt of a feed demand signal.

Apparatus embodying the present invention includes a feed supplying system including a drive motor for supplying a feed pan with feed from a supply thereof. A shock wire extends along the feed system and the feed pan includes means coupled to the shock wire for developing feed demand signals as the feed falls below a predetermined level. A control circuit is coupled to the shock wire for supplying a relatively high voltage to the shock wire and for detecting feed demand signals transmitted therealong to actuate the drive motor to selectively supply feed to the pan on demand.

It is an object, therefore, of the present invention to provide an improved automatic feeding system.

Another object of the present invention is to provide a feed motor control circuit for supplying a relatively high voltage to a shock wire while receiving feed command signals therealong.

Still a further object of the present invention is to provide a current responsive control circuit for discriminating between feed demand signals and shock current signals, both of which are transmitted along a shock wire associated with a poultry feeder.

An additional object of this invention is to provide an integral control circuit for supplying a relatively high voltage to a shock wire and providing a motor control for a feed drive motor.

These and other objects of the present invention will become apparent upon reading the following description thereof together with the drawings in which:

DETAILED DESCRIPTION OF THE PREFERRED EMBODIMENT

Figure 1:
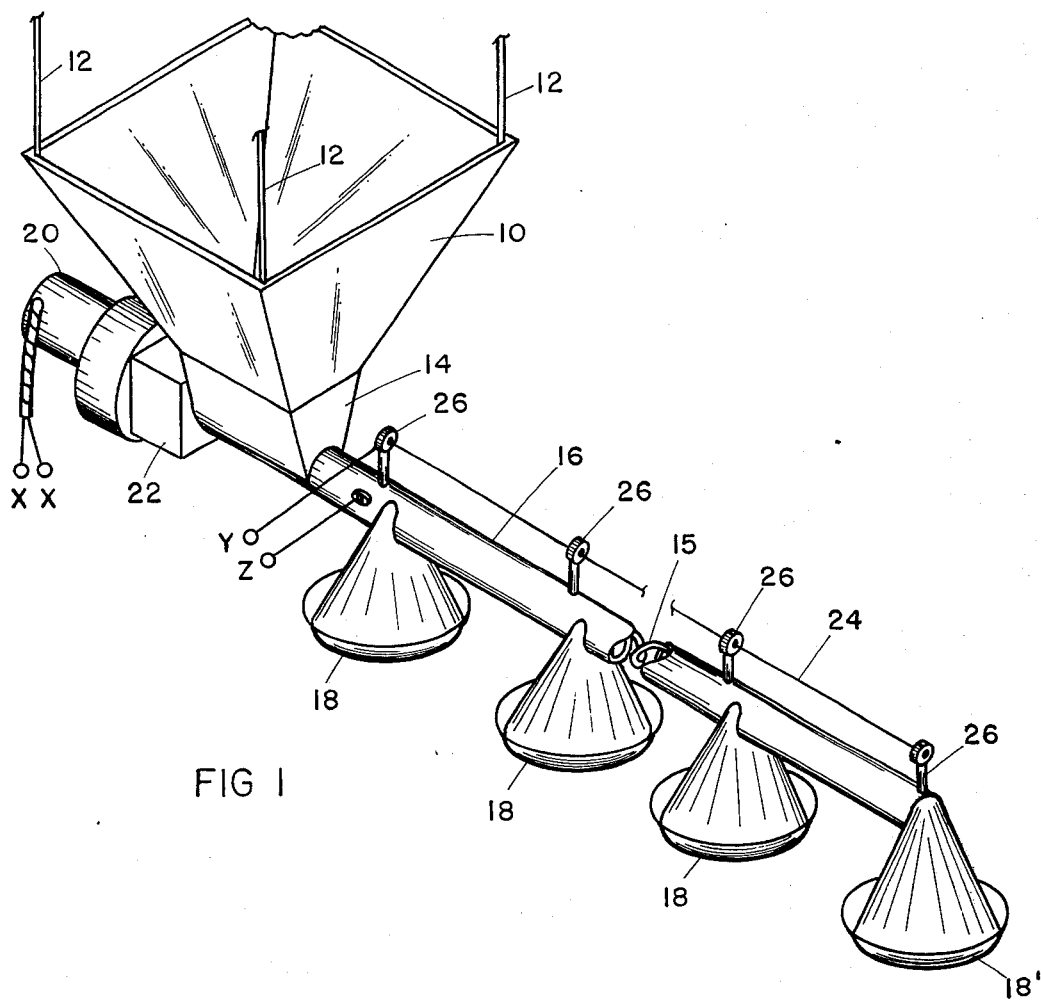
FIG. 1 is a fragmentary perspective view of the feeder system of the present invention.

Referring now to FIG. 1, there is shown a poultry feeder including a feed hopper 10 for receiving a quantity of bulk feed in granulated form. The hopper is suspended from the ceiling of an installation by a plurality of cables 12 and is coupled at the narrowed lower end 14 to an elongated auger or feed tube 16. The neck portion 14 supplies feed in hopper 10 to an auger 15 within tube 16. The auger is driven by a feed drive motor 20 coupled to the auger by means of a suitable gear box 22. The elongated auger tube 16 may also include support cables (not shown) extending to the ceiling of the installation.

Spaced along the length of feed tube 16 is a plurality of feed pans 18 including an end pan 18' positioned at the end of the auger tube remote from drive motor 20. Each of the pans is generally conical in shape and communicates with the interior of the auger tube 16 such that feed drops into a peripheral feeding rim extending around the floor of the pan.

The feed hopper and auger tube 16 are suspended from the ceiling at a height to enable poultry such as chickens to eat from the pans. At this height, however, the birds can hop up on auger tube 16 and roost thereon. This is undesirable for several reasons including the fact that it adds considerable weight to the feeder and the droppings from the birds can contaminate the food. To prevent roosting on the auger tube, therefore, a shock wire 24 is mounted above the auger tube in spaced relationship and insulated therefrom by a plurality of spaced insulators 26. The structure so far described is substantially similar to the mechanical construction of the poultry feeders disclosed in the above identified patents which are incorporated herein by reference. In such construction, the end pan 18' includes a feed level detecting switch 28 (FIG. 2), the construction of which is disclosed in detail in FIG. 4 of the above identified Van Huis patent.

Figure 2:
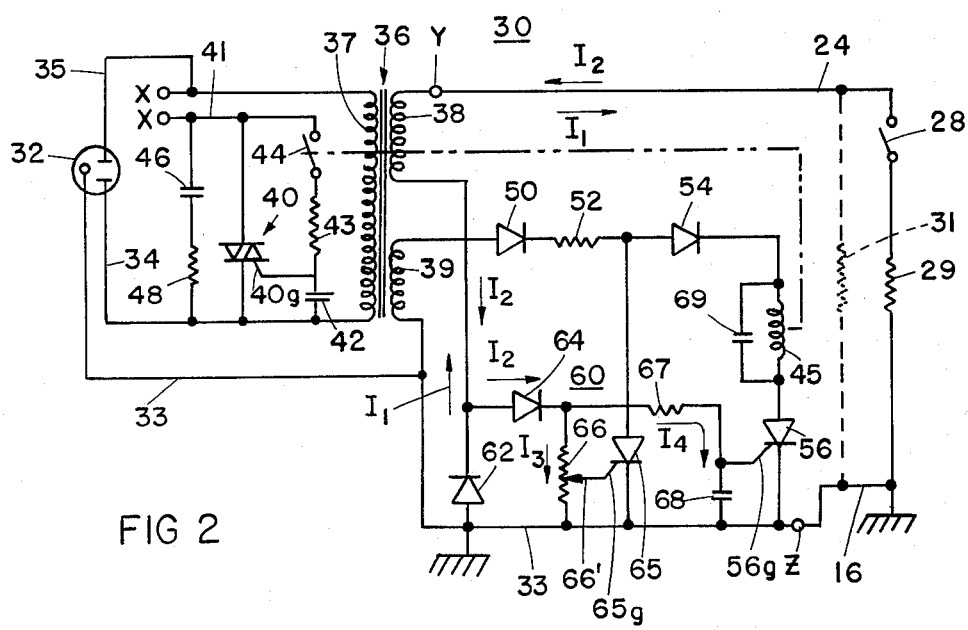
FIG. 2 is a schematic diagram of the control circuit therefor.

The control circuit 30 for the feeder is shown in detail in FIG. 2 and includes an electrical supply plug 32 having a ground conductor 33 extending therefrom, a common conductor 34 and a 117 V AC conductor 35. Plug 32 is adapted to be fitted into a standard three-prong 117 V AC supply socket. A power transformer 36 includes a primary winding 37 coupled between conductors 34 and 35 for developing a relatively high voltage output across a high voltage secondary winding 38 and a relatively low voltage output across the power supplying secondary winding 39.

Control circuit 30 supplies drive current for motor 20 from the primary circuit of transformer 36 which includes a triac 40 having one terminal coupled to conductor 34 and a second terminal coupled to a conductor 41. The gate terminal 40g of triac 40 is coupled to conductor 34 through a capacitor 42 and is further coupled to conductor 41 through resistor 43 and the switch contact 44 of a relay 45. The mechanical interconnection between the relay coil 45 and its contacts 44 is illustrated in dotted lines in FIG. 2. Coupled in parallel with triac 40 is a series network comprising capacitor 46 and a resistor 48.

Conductors 35 and 41 are coupled to the pair of input terminals X—X of drive motor 20 for auger 15 by means of interconnected terminals X—X in FIGS. 1 and 2. Current for the motor is supplied through triac 40 when conducting to complete the current path from the power source between conductors 35 and 34 with the motor in series between terminals X—X in FIG. 2.

The secondary circuit of transformer 36 includes an output terminal Y coupled to one terminal of high voltage winding 38 and to shock wire 24. Wire 24 is coupled to feed level switch 28 and returned to conductor 33 (forming chassis ground) through a resistor 29 and auger tube 16 which is made of a conductive material. Resistor 31, shown in phantom form in the figure and coupled between wire 24 and auger tube 16, represents the resistance of a chicken which is in the order of 10 K ohms. Resistor 29 has a resistance of approximately 1 M ohm.

Low voltage winding 39 supplies alternating current to a rectifying diode 50, a current limiting resistor 52 and to the relay coil 45 through a blocking diode 54. A first SCR 56 completes the current path for coil 45 from the low voltage power supply thereformed to the chassis ground. Gate terminal 56g of SCR 56 is coupled to a trigger circuit 60 defined by a negative clamping diode 62 having its anode coupled to chassis ground and its cathode coupled to one end of high voltage winding 37. A rectifying diode 64 has its anode coupled to the cathode of diode 62 and its cathode coupled to a potentiometer 66 and further to gate 56g of SCR 56 through a current limiting resistor 67. Capacitor 68 is coupled from gate 56g to chassis ground. A filter capacitor 69 is coupled in parallel across relay coil 45.

A second SCR 65 has its anode coupled to the junction of resistor 52 and diode 54 and its cathode coupled to ground. Gate terminal 65g is coupled to the wiper arm 66' of potentiometer 66.

As noted above, the actuation of triac 40 completes the current path for drive motor 20 and actuates the motor to rotate auger 15 for supplying feed from hopper 10 to feeder pans 18. This occurs upon demand indicated by the closure of switch 28 when the feed level falls below a predetermined level. When the feed level has been restored, the opening of switch 28 inactivates motor 20. The use of shock wire 24 coupling switch 28 to the control circuit eliminates the necessity of additional wiring. Also, auger tube 16 serves as one of the conductors between the control circuit and switch 28. It is noted here that the circuitry of FIG. 2 can occupy a relatively small space and can be mounted directly to the bottom of the hopper at any convenient location.

The operation of the current responsive circuit 30 to provide both the high voltage supply for the shock wire 24 and a motor drive signal for motor 20 is now described. To fully understand the operation, first a description of the control of triac 40 under feed demand conditions will be described.

OPERATION

Shock wire 24 is supplied with a relatively high voltage (800 V AC in the preferred embodiment) by secondary winding 37 of transformer 36. When the feed has dropped below the desired predetermined level in end pan 18', demand switch 28 closes to complete the current path for winding 38. During one half of each AC cycle of operation, a current flows through winding 38 in a direction indicated by $I_1$ in FIG. 2. Current $I_1$ flows through diode 62 and winding 38 in the direction indicated by the accompanying arrow. During this portion of the cycle, diode 64 is nonconductive and SCR 56 remains off since no gate current is supplied to it through diode 64.

During the second half cycle of operation, however, the current reverses in winding 38 and flows through diode 64 as seen by $I_2$ in the figure. Current $I_2$ divides with a portion $I_3$ flowing through resistor 66 and the remaining portion $I_4$ flowing through the parallel path of resistor 67 and capacitor 68. Since resistor 29 is 1 M ohm, current $I_2$ is in the neighborhood of 800 $\mu a$. Component $I_3$ of this current develops a relatively small voltage at wiper arm 66' of potentiometer 66 which is adjusted such that the second SCR 65 will not be rendered conductive. Current component $I_4$, however, charges capacitor 68 over a few successive cycles to develop a positive voltage applied to gate 56g of SCR 56. SCR 56 responds to conduct to permit current from the low voltage power supply to flow through relay coil 45 thereby closing contacts 44 in the primary circuit of transformer 36. The application of voltage to capacitor 42 through resistor 43 triggers triac 40 into conduction thereby starting motor 20.

Once the auger has supplied food to the feed pans including end pan 18' to the predetermined levels, switch 28 again opens thereby interrupting the current path and capacitor 68 discharges through resistors 67 and 66 such that with the positive gate voltage removed, SCR 56 will be rendered nonconductive as the alternating voltage applied to the anode drops to zero (which occurs each cycle). It is noted here that capacitor 69 is sufficiently large to prevent chattering of contacts 44 associated with relay coil 45. With relay contact 44 now open, triac 40 will be rendered nonconductive thereby opening the current path of motor 20 which in turn shuts off. Capacitor 46 and resistor 48 are merely provided to prevent accidental turn-on of the triac due to spurious voltages.

In the event a chicken attempts to roost on auger tube 16, it will complete a circuit path between shock wire 24 and chassis ground thereby causing a resistance 31 to be impressed between terminals Y and Z. This resistance will be significantly smaller than resistance 29 such that current $I_2$ will be significantly greater (i.e., in the order of 80 ma). In this case, with an increased value of $I_2$, component $I_3$ will likewise increase in magnitude such that the voltage at wiper arm 66' will now be sufficient to trigger SCR 65 into conduction. It is noted that capacitor 68 will initially begin charging at this time but the almost immediate actuation of SCR 65 occurs before the voltage on capacitor 68 is sufficient to fire SCR 56. With SCR 65 conductive and coupled in parallel with relay coil 45 and SCR 56, it effectively bypasses current from the power supply to the relay coil thereby preventing actuation of SCR 56 and, therefore, actuation of relay 45 and its contacts 44.

The system also detects the condition where the high voltage wire is shorted to ground such as the tube 16 or other point by the weight of a fowl or otherwise. A fowl will receive a mild shock to prevent perching and the circuit operates as noted above. If the shock wire 24 is directly grounded, however, the current will be significantly greater than the shock and feed demand currents and quickly causes the actuation of SCR 65 to deactuate or prevent actuation of the feed motor 20.

Thus, circuit 30 is capable of discriminating between relatively small currents corresponding to feed demand signals and relatively large currents corresponding to shock or short circuit currents to actuate motor 20 only when a feed demand signal is received. Resistor 66 is field adjustable for the proper threshold to provide this current discrimination. It will become apparent that various modifications to the preferred embodiment can be made by those skilled in the art without departing from the spirit or scope of this invention as defined by the appended claims.

The embodiments of the invention in which an exclusive property or privilege is claimed are defined as follows.

1. In a feed supply system including a hopper and means for transferring feed from the hopper to a remote feeding station which includes a feed level sensor for selectively actuating a drive motor associated with said transfer means, said feed supply system further including a shock wire mounted thereto, a control circuit for actuating said drive motor and said shock wire comprising:
   a relatively high voltage power supply;
   means for coupling said high voltage power supply to the shock wire and to the feed level sensor;
   supply means for supplying operating current to the drive motor, said supply means including a controllable switch; and
   current sensing means coupled to said high voltage power supply and to said controllable switch and responsive to the actuation of said feed sensor for actuating said controllable switch to apply operating current to said drive motor when said feed sensor detects a feed supply below a predetermined level.

2. The system as defined in claim 1 wherein said coupling means includes a resistor of predetermined value for establishing a current flow through said high voltage power supply different than that effected by shorting of the shock wire by an animal.

3. The system as defined in claim 2 wherein said current sensing means includes a current dividing network coupled to said high voltage power supply and first triggerable switching means having a control terminal coupled to one leg of said current dividing network for actuation of said first triggerable switching means in response to current supplied to said one leg through said resistor when said feed sensor detects a feed supply below a predetermined level.

4. The system as defined in claim 3 and further including relay means coupled to said first triggerable switching means and to said controllable switch and responsive to the actuation of said first triggerable switching means to actuate said controllable switch for supplying operating current to said drive motor.

5. The system as defined in claim 4 and further including a second triggerable switching means including a control terminal coupled to the other leg of said current dividing network, said second triggerable switching means coupled in parallel with said first triggerable switching means to prevent actuation of said first triggerable switching means when said second triggerable switching means is actuated, said second triggerable switching means being actuated by current flow in said second leg of said current dividing network which is substantially greater than current flow therein when said feed sensor detects feed below a predetermined level.

6. The system as defined in claim 5 wherein said second leg of said current dividing network includes a potentiomter including a wiper arm wherein said wiper arm is coupled to said control terminal of said second triggerable switching means whereby said potentiometer wiper arm can be adjusted to set the trigger point of said second triggerable switching means.

7. In a control system for supplying a high voltage to the shock wire of a poultry feeding device and controlling the drive motor of an auger feeder which transports feed from a hopper to one or more remote feed pans, wherein one of the feed pans includes a feed level switch, the improvement comprising:
   means for coupling said feed level switch to said shock wire to establish a current flow of a predetermined level in said shock wire when said feed level switch is actuated, said predetermined current level being significantly different than that established when a fowl contacts said shock wire; and
   a control circuit coupled to said coupling means for detecting said predetermined level current flow and to said drive motor for actuating said drive motor when said feed level switch is actuated indicating a demand for feed.

8. The control system as defined in claim 7 wherein said control circuit comprises:
   a relatively high voltage power supply coupled to said shock wire;
   supply means including a controllable switch for supplying operating current to the auger drive motor;
   a current dividing network having first and second current paths coupled to said high voltage power supply;
   first triggerable switch means including a control terminal coupled to said first current path of said current dividing network and coupled to said controllable switch for actuating said controllable switch when the feed level switch is actuated; and
   second triggerable switch means including a control terminal coupled to said second current path of said current dividing network and coupled to said first triggerable switch to defeat actuation of said first triggerable switch if current in said current dividing network significantly exceeds said predetermined level.

9. The control system as defined in claim 8 wherein said second current path of said current dividing network includes a potentiometer including a wiper arm wherein said wiper arm is coupled to said control terminal of said second triggerable switching means whereby said potentiometer wiper arm can be adjusted to set the trigger point of said second triggerable switching means.

10. The control system as defined in claim 9 wherein said first current path of said current dividing network includes charge storage means coupled to said control terminal of said first triggerable switching means to delay actuation of said first triggerable switching means.

11. The control system as defined in claim 10 wherein each of said first and second triggerable switching means comprises an SCR.

* * * * *